(12) United States Patent
Ying et al.

(10) Patent No.: US 10,573,970 B2
(45) Date of Patent: Feb. 25, 2020

(54) ANTENNA ARRANGEMENT ON A CIRCUIT BOARD

(71) Applicant: SONY MOBILE COMMUNICATIONS INC., Tokyo (JP)

(72) Inventors: Zhinong Ying, Lund (SE); Thomas Bolin, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/780,596

(22) PCT Filed: Jan. 28, 2016

(86) PCT No.: PCT/IB2016/050431
§ 371 (c)(1),
(2) Date: May 31, 2018

(87) PCT Pub. No.: WO2017/130027
PCT Pub. Date: Aug. 3, 2017

(65) Prior Publication Data
US 2018/0366832 A1    Dec. 20, 2018

(51) Int. Cl.
*H01Q 13/16*    (2006.01)
*H01Q 1/48*    (2006.01)
*H04Q 1/38*    (2006.01)

(52) U.S. Cl.
CPC ............. *H01Q 13/16* (2013.01); *H01Q 1/48* (2013.01); *H04Q 1/38* (2013.01)

(58) Field of Classification Search
CPC ........ H01Q 13/16; H01Q 13/10; H01Q 1/243; H01Q 5/307; H01Q 9/04; H01Q 21/28; H01Q 21/30
See application file for complete search history.

(56) References Cited

U.S. PATENT DOCUMENTS

| | | | | |
|---|---|---|---|---|
| 8,350,772 B2* | 1/2013 | Seo | ........................ | H01Q 1/243 343/702 |
| 2005/0259013 A1* | 11/2005 | Gala Gala | .............. | H01Q 1/243 343/702 |

(Continued)

FOREIGN PATENT DOCUMENTS

| EP | 1670093 A1 | 6/2006 |
|---|---|---|
| EP | 2712025 A1 | 3/2014 |
| GB | 2476132 A | 6/2011 |

OTHER PUBLICATIONS

International Search Report and Written Opinion from corresponding International Patent Application No. PCT/IB2016/050431, dated Oct. 26, 2016.

*Primary Examiner* — Hoang V Nguyen
(74) *Attorney, Agent, or Firm* — Tucker Ellis LLP

(57) ABSTRACT

The present invention relates to an antenna arrangement on a circuit board (10) extending along a length direction, L, and a width direction, W, the width direction being orthogonal to the length direction. The antenna arrangement comprising: a cell-band antenna (20); a ground plane (30) associated with the cell-band antenna; and a slit antenna (40) arranged in a slit antenna portion (32) of the ground plane, the slit antenna comprising a slit (42) in the ground plane, the slit having in the width direction a slit extension extending from an in the length direction extending edge (34) of the ground plane, the slit extension being 50-95% of an in the width direction extending total width of the slit antenna portion.

15 Claims, 4 Drawing Sheets

(56) References Cited

U.S. PATENT DOCUMENTS

2006/0208901 A1    9/2006   Kai
2009/0231211 A1    9/2009   Zweers
2010/0053012 A1    3/2010   Seo

* cited by examiner

ANTENNA ARRANGEMENT ON A CIRCUIT BOARD

TECHNICAL FIELD

The present invention relates to an antenna arrangement on a circuit board.

BACKGROUND

Small size, less than credit card size, radio frequency modules having integrated cell-band antennas present poor over the air performance at the radio frequency band within the interval 700-900 MHz. This is due to the limitation in size of a ground plane of such radio frequency modules. Hence, there is a need for an improvement in the over the air performance within the 700-900 MHz band for radio frequency modules of size less than a credit card.

SUMMARY OF THE INVENTION

In view of the above, it is an object of the present invention to provide the above mentioned improvement.

According to a first aspect an antenna arrangement on a circuit board is provided. The circuit board extends along a length direction, L, and a width direction, W, the width direction being orthogonal to the length direction. The antenna arrangement comprises: a cell-band antenna; a ground plane associated with the cell-band antenna; and s slit antenna arranged in a slit antenna portion of the ground plane, the slit antenna comprising a slit in the ground plane, the slit having in the width direction a slit extension extending from an in the length direction extending edge of the ground plane, the slit extension being 50-95% of an in the width direction extending total width of the slit antenna portion.

Accordingly, a geometrical extension of the ground plane is provided improving the over the air performance for the cell-band antenna. Especially, according to the present design the slit of the slit antenna is utilized for both forming the slit antenna and the geometrical extension of the ground plane. Hence, according to the present antenna arrangement the ground plane, counterpoise, to the cell-band antenna is electrically extended. This improve the over the air performance of the cell-band antenna. Thus, according to the present antenna arrangement two functions are realized at the same time in the circuit board, both the geometrical extension of the length of the ground plane and the implementation of a high performing slit antenna.

The ground plane may comprise an in the length direction and in the width direction extending mid portion, the mid portion is arranged between the cell-band antenna and the slit antenna, the mid portion having in the width direction a mid portion extension extending from the edge of the ground plane, the mid portion extension being smaller than, preferably 20-60%, the slit extension. Such a configuration of the ground plane even further geometrically extends the length of the ground plane.

The ground plane may comprise a cell-band antenna connection portion, the cell-band antenna connection portion having in the width direction a connection portion extension extending from the edge of the ground plane, the connection portion extension being greater than the mid portion extension, wherein a connection connecting the cell-band antenna to the ground plane at the cell-band antenna connection portion thereof is located in the width direction at a distance from the edge of the ground plane being greater than, preferably at least two times, the mid portion extension. Such a configuration of the ground plane and location of the connection connecting the cell-band antenna to the ground plane even further geometrically extends the length of the ground plane.

The cell-band antenna and the slit antenna may be arranged on, in the length direction, opposite side portions of the circuit board. Such a configuration provide for optimal utilization of the surface area of the circuit board to get as geometrically extended ground plane as possible.

A side portion of the circuit board may be within 5-20% from an in the length direction seen end of the circuit board.

The circuit board may be a printed circuit board, and wherein the cell-band antenna and the ground plane may comprise a respective printed trace on the printed circuit board.

At least two of the cell-band antenna, the ground plane and the slit antenna may be formed as different layers.

The layers may be connected by via holes.

The cell-band antenna may be configured to be operated on at least one radio frequency band comprising the interval 700-900 MHz.

The slit antenna may be configured to be operated on at least one radio frequency band comprising the interval 700-3500 MHz.

The slit antenna may comprise an antenna in the group of antennas consisting of a Global Navigation Satellite System, GNSS, antenna, a Bluetooth antenna, a cell-band antenna, cell-band diversity antenna, a WiFi antenna and a WiFi diversity antenna.

The slit antenna may be associated with the ground plane.

The circuit board may have a length extension along the length direction less than 85 mm and a width extension along the width direction less than 85 mm, preferably less than 50 mm.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
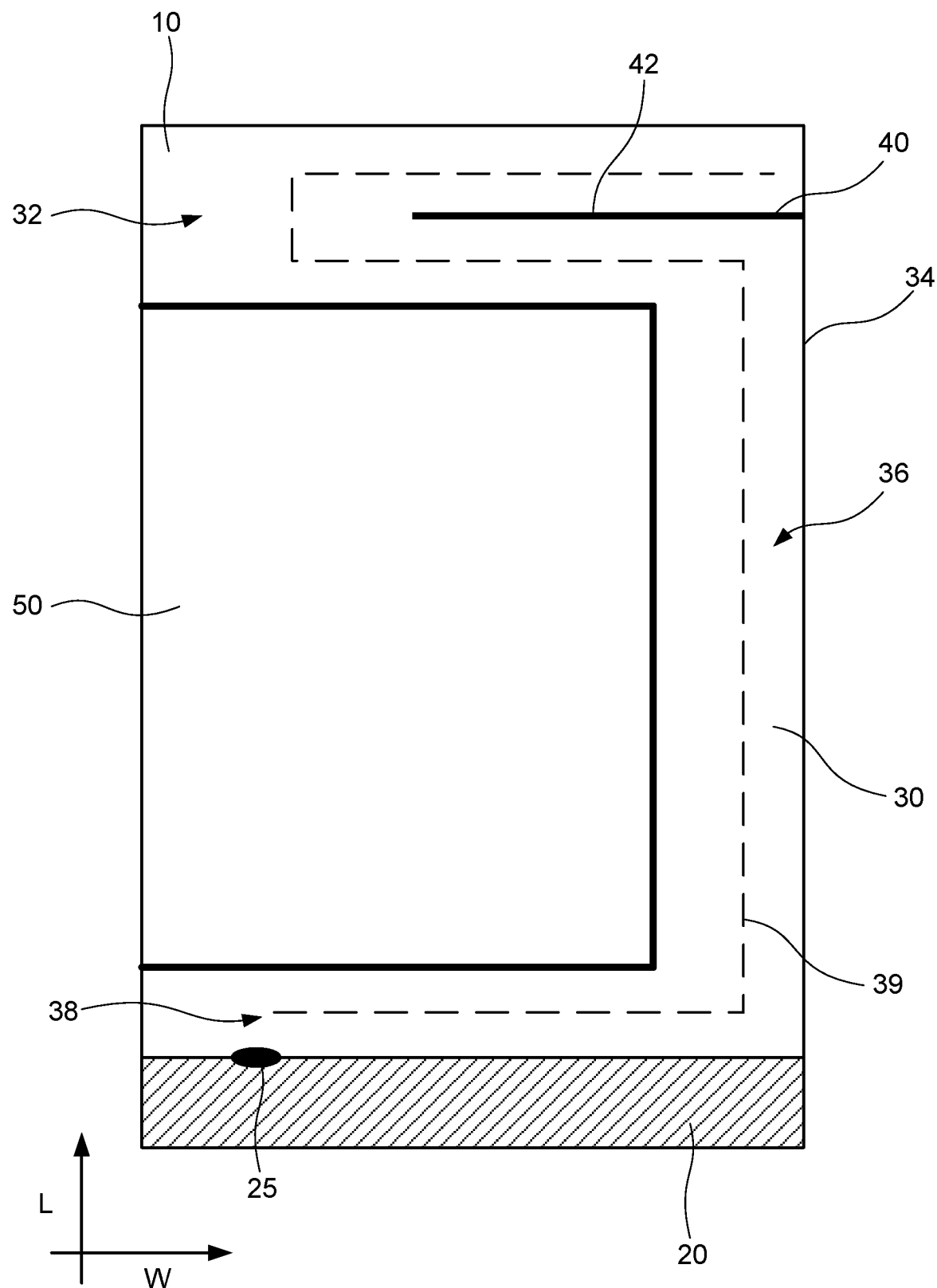
FIG. 1 illustrates an antenna arrangement on a circuit board.

FIG. 1 illustrates an antenna arrangement on a circuit board 10. The antenna arrangement comprises a cell-band antenna 20, a ground plane 30 and a slit antenna 40. The antenna arrangement forming part of an electronic device; the electronic device is preferably an Internet of Things, IoT, module.

The circuit board 10 extends along a length direction L and a width direction W. The width direction, W, being orthogonal to the length direction, L. Preferably, the circuit board 10 is of a size smaller than a credit card. The circuit board 10 has a length extension along the length direction, L, less than 85 mm. The circuit board 10 has a width extension along the width direction, W, less than 85 mm, preferably less than 50 mm. The circuit board 10 is preferably a printed circuit board. However, other kind of circuit boards may as well be used. The cell-band antenna 20 may comprise printed traces. The ground plane 30 may comprise printed traces. At least two of the cell-band antenna 20, the ground plane 30 and the slit antenna 40 may be formed as different layers. The layers may be connected by via holes.

Preferably, the cell-band antenna 20 and the slit antenna 40 are arranged on, in the length direction, L, opposite side portions of the circuit board 10. However, other designs of the antenna arrangement may also be used, see below. A side portion of the circuit board 10 is within 5-20% from an in the length direction, L, seen end of the circuit board 10.

The cell-band antenna 20 is configured to be operated on at least one radio frequency band comprising the interval 700-900 MHz. The ground plane 30 is associated with the cell-band antenna 20. The ground plane 30 acts as a counterpoise to the cell-band antenna 20.

The slit antenna 40 is arranged in a slit antenna portion 32 of the ground plane 30, the slit antenna 40 comprising a slit 42 or recess in the ground plane 30. The slit 42 have in the width direction, W, a slit extension extending from an in the length direction, L, extending edge 34 of the ground plane 30. The slit extension is 50-95% of an in the width direction, W, extending total width of the slit antenna portion 32.

The slit antenna 40 is configured to be operated on at least one radio frequency band preferably comprising the interval 700-3500 MHz. The slit antenna 40 comprises an antenna in the group of antennas consisting of a Global Navigation Satellite System, GNSS, antenna, a Bluetooth antenna, a cell-band antenna, cell-band diversity antenna, cell-band diversity antenna, a WiFi antenna and a WiFi diversity antenna.

The slit antenna 40 is further connected to the ground plane 30. The connection between the slit antenna 40 and the ground plane 30 is preferably arranged in close proximity (within some mm) to the end of the slit 42 being opposite the edge 34 of the ground plane 30.

The ground plane 30 may further comprise an in the length direction, L, and in the width direction, W, extending mid portion 36. The mid portion 36 is arranged between the cell-band antenna 20 and the slit antenna 40. The mid portion 36 has in the width direction, W, a mid portion extension extending from the edge 34 of the ground plane 30. The mid portion extension is smaller than, preferably 20-60%, the slit extension.

The ground plane may further comprise a cell-band antenna connection portion 38. The cell-band antenna connection portion 38 has in the width direction, W, a connection portion extension extending from the edge 34 of the ground plane 30. The connection portion extension is greater than, preferably at least two times, the mid portion extension.

The antenna arrangement may further comprise a connection 25 connecting the cell-band antenna 20 to the ground plane 30. The connection 25 is located at the cell-band antenna connection portion. The connection 25 is located in the width direction at a distance from the edge of the ground plane being greater than, preferably at least two times, the mid portion extension.

According to the above proposed designs of the ground plane 30, the ground plane 30 exhibit a meander pattern; this lead to that the ground plane is made geometrically longer than the physical extension of the circuit board. Hence, the ground plane 30 is extended by the introduced meandering pattern. Especially, according to the present design the slit antenna 40 is utilized for forming the meandering pattern. By this design two functions of the antenna arrangement are integrated into one structure of the circuit board 10, namely the slit 42. The slit 42 is forming both the slit antenna 40 and at least a part of the meandering pattern. In FIG. 1 an exemplified design of the meandering pattern 39 is shown.

The person skilled in the art realizes that the present invention by no means is limited to the preferred embodiments described above. On the contrary, many modifications and variations are possible within the scope of the appended claims.

For example, in the exemplified embodiment of FIG. 1 the cell-band antenna 20 is configured as forming part of the circuit board 10; this design benefit from low cost and simple manufacturing. However, an alternative configuration is to arrange the cell-band antenna 20 on an additional circuit board, not shown. The additional circuit board may be a printed circuit board. The additional circuit board may be oriented at an angle, preferably orthogonal, to the circuit board 30. The use of the additional circuit board for holding the cell-band antenna provide for a smaller design of the circuit board 30.

Figure 2:
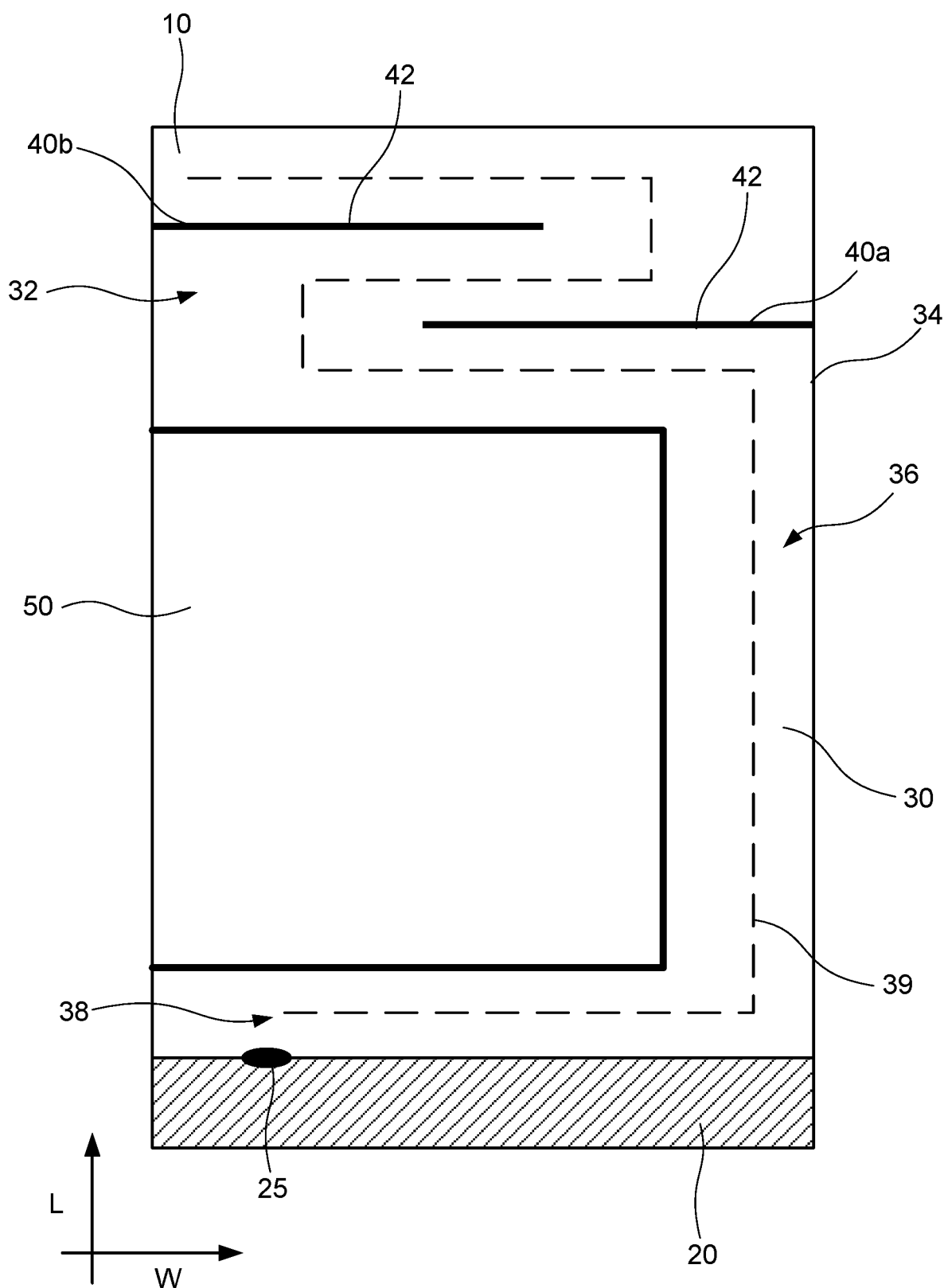
FIG. 2 illustrates an alternative antenna arrangement on a circuit board.

Moreover, the antenna arrangement may comprise more than one slit antenna. This is exemplified in FIG. 2 showing an alternative configuration of an antenna arrangement. A second slit antenna 40b, see FIG. 2, may then be arranged within the slit antenna portion 32. Hence, according this exemplified embodiment the antenna arrangement comprises a first slit antenna 40a and a second slit antenna 40b. The first and second slit antennas 40a, 40b may be configured as different antennas from the group of antennas consisting of a Global Navigation Satellite System, GNSS, antenna, a Bluetooth antenna, a cell-band antenna, cell-band diversity antenna, a WiFi antenna and a WiFi diversity antenna. The first and second slit antennas 40a, 40b is configured to have an outer end located at opposite edges of the ground plane 30. This configuration of the antenna arrangement provide for further extension of the ground plane since one more turn in the meandering pattern is introduced.

Figure 3:
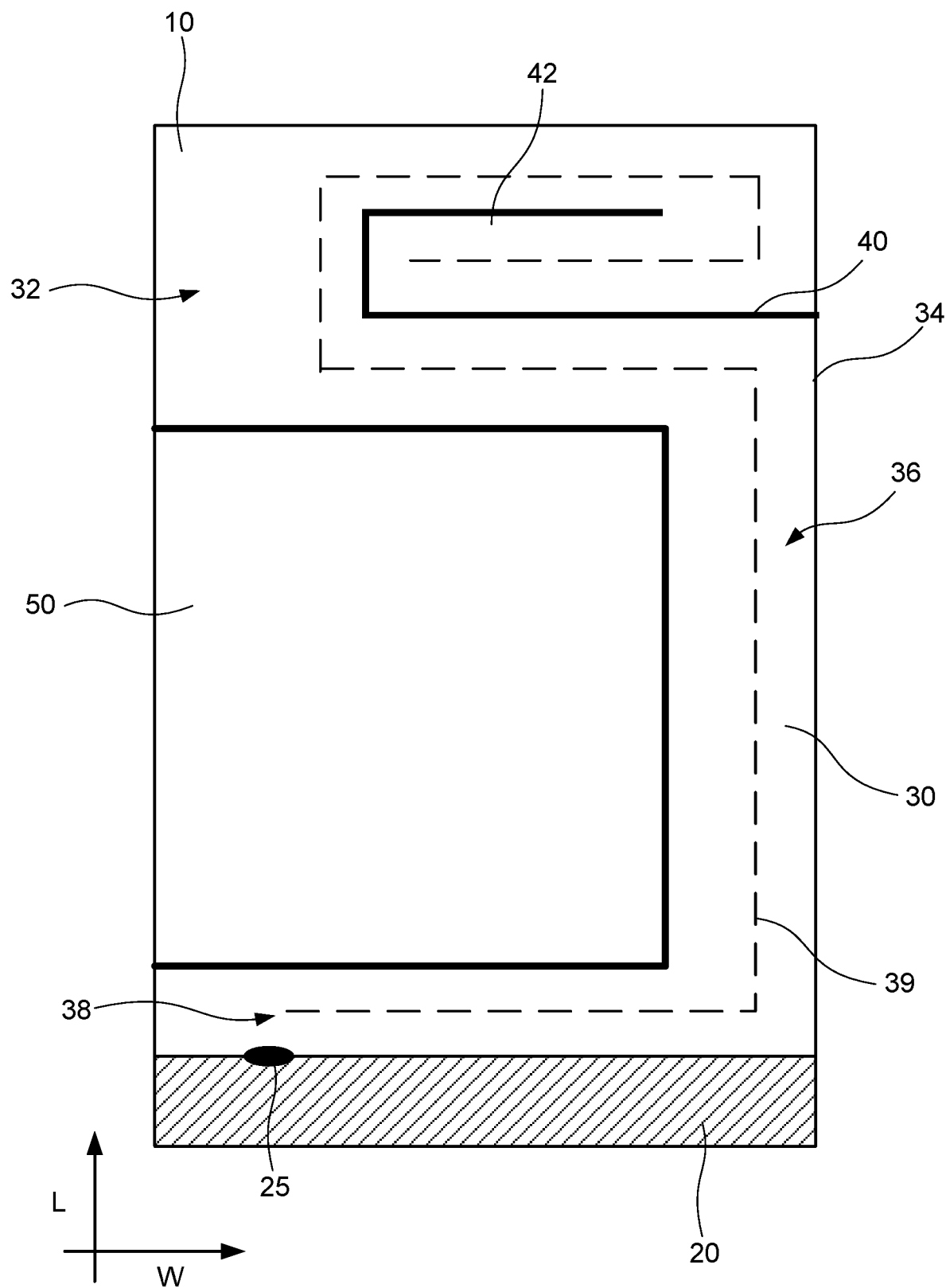
FIG. 3 illustrates yet an alternative antenna arrangement on a circuit board.
Figure 4:
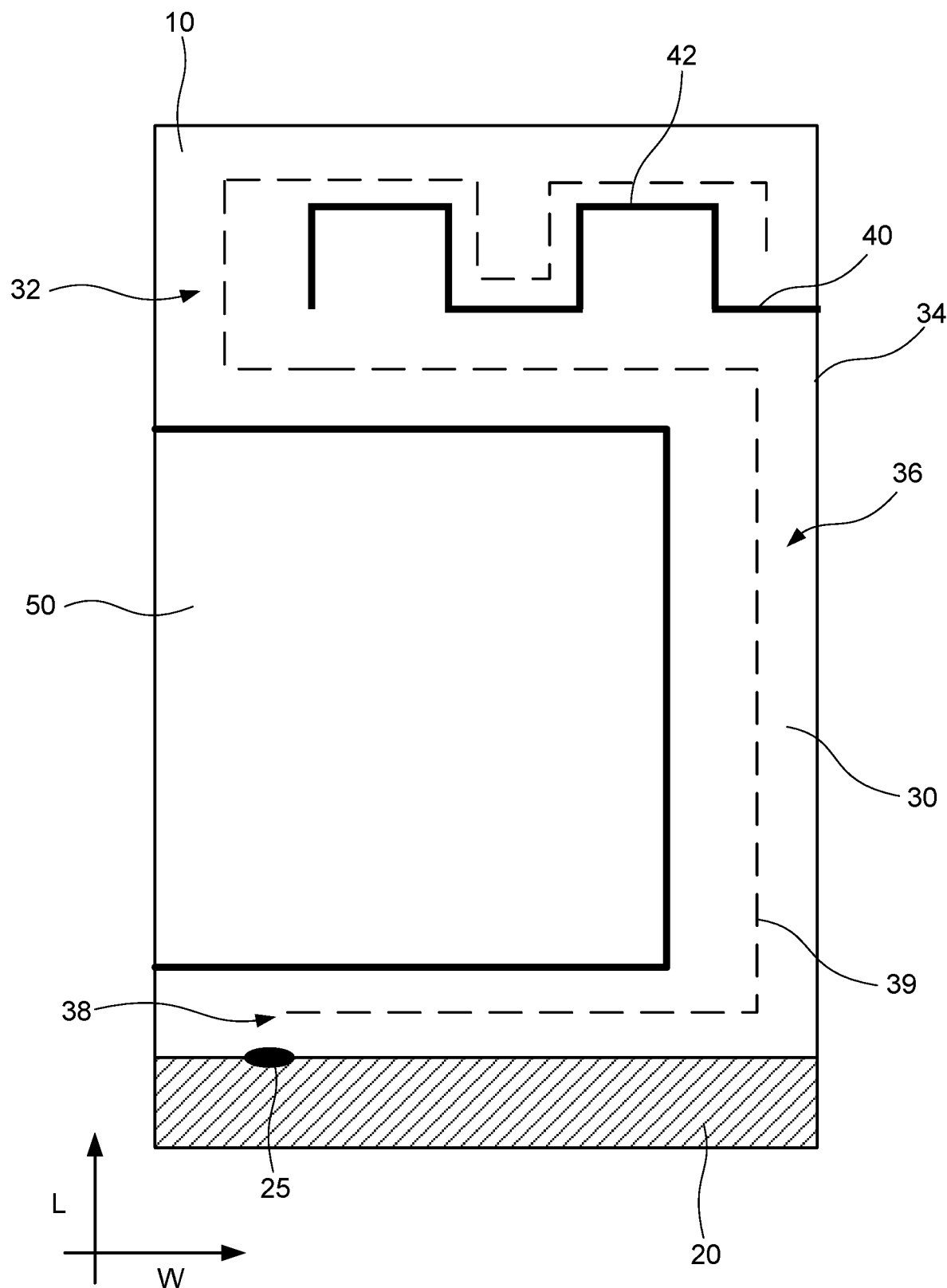
FIG. 4 illustrates a further alternative antenna arrangement on a circuit board.

Furthermore, in the above exemplified embodiments the slit 42 of the slit antenna 40 is in the form of a straight line. However, other forms of the slit 42 may also be used. For example, the slit 42 itself may form a meandering pattern. By altering the design and the number of turn in the meandering pattern of the slit 42, the working frequency band of the slit antenna 30 may be altered. Moreover, by altering the design and the number of turn in the meandering pattern of the slit 42, the ground plane 30 may be further extended. Exemplified embodiments of an antenna arrangement comprising a slit antenna 40 with a slit 42 having a meandering pattern are illustrated in FIGS. 3 and 4. It is however, realized that other designs and other number of turns in the meandering pattern may also be used.

Moreover, the circuit board may further comprise further electrical components, such as a battery 50. The further electrical components may be located in a portion of the circuit board delimited by the slit antenna portion 32, the mid portion 36 and the cell-band antenna connection portion 38 of the ground plane 30.

Additionally, variations to the disclosed embodiments can be understood and effected by the skilled person in practicing the claimed invention, from a study of the drawings, the disclosure, and the appended claims.

The invention claimed is:

1. An antenna arrangement on a circuit board extending along a length direction and a width direction the width direction being orthogonal to the length direction, the antenna arrangement comprising:
   a cell-band antenna;
   a ground plane associated with the cell-band antenna and the ground plane acting as a counterpoise to the cell-band antenna; and
   a slit antenna arranged in a slit antenna portion of the ground plane, the slit antenna comprising a slit in the ground plane, the slit having, in the width direction, a slit extension extending from, in the length direction, an extending edge of the ground plane, the slit extension being 50-95% of an in the width direction extending total width of the slit antenna portion, wherein the ground plane comprises an in the length direction and in the width direction extending mid portion, the mid portion is arranged between the cell-band antenna and the slit antenna, the mid portion having in the width direction a mid portion extension extending from the edge of the ground plane, the mid portion extension being smaller than the slit extension.

2. The antenna arrangement according to claim 1, wherein the mid portion extension is smaller than 20-60% of the slit extension.

3. The antenna arrangement according to claim 1, wherein the ground plane comprises a cell-band antenna connection portion, the cell-band antenna connection portion having in the width direction a connection portion extension extending from the edge of the ground plane, the connection portion extension being greater than the mid portion extension, wherein a connection connecting the cell-band antenna to the ground plane at the cell-band antenna connection portion thereof is located in the width direction at a distance from the edge of the ground plane being greater than, preferably at least two times, the mid portion extension.

4. The antenna arrangement according to claim 1, wherein the circuit board is a printed circuit board, and wherein the cell-band antenna and the ground plane comprises a respective printed trace on the printed circuit board.

5. The antenna arrangement according to claim 1, wherein at least two of the cell-band antenna, the ground plane and the slit antenna are formed as different layers.

6. The antenna arrangement according to claim 5, wherein the layers are connected by via holes.

7. The antenna arrangement according to claim 1, wherein the cell-band antenna is configured to be operated on at least one radio frequency band comprising the interval 700-900 MHz.

8. The antenna arrangement according to claim 1, wherein the slit antenna is configured to be operated on at least one radio frequency band comprising the interval 700-3500 MHz.

9. The antenna arrangement according to claim 1, wherein the slit antenna comprises an antenna in the group of antennas consisting of a Global Navigation Satellite System (GNSS) antenna, a Bluetooth antenna, a cell-band antenna, a cell-band diversity antenna, a WiFi antenna and a WiFi diversity antenna.

10. The antenna arrangement according to claim 1, wherein the slit antenna is associated with the ground plane.

11. The antenna arrangement according to claim 1, wherein the circuit board has a length extension along the length direction less than 85 mm and a width extension along the width direction less than 85 mm, preferably less than 50 mm.

12. The antenna arrangement according to claim 1, comprising a plurality of slit antennas.

13. The antenna arrangement according to claim 1, wherein the slit of the slit antenna adds meander bends to the ground plane.

14. An antenna arrangement on a circuit board extending along a length direction and a width direction the width direction being orthogonal to the length direction, the antenna arrangement comprising:
   a cell-band antenna;
   a ground plane associated with the cell-band antenna and the ground plane acting as a counterpoise to the cell-band antenna; and
   a slit antenna arranged in a slit antenna portion of the ground plane, the slit antenna comprising a slit in the ground plane, the slit having, in the width direction, a slit extension extending from, in the length direction, an extending edge of the ground plane, the slit extension being 50-95% of an in the width direction extending total width of the slit antenna portion, wherein the cell-band antenna and the slit antenna are arranged on, in the length direction, opposite side portions of the circuit board.

15. The antenna arrangement according to claim 14, wherein a side portion of the circuit board is within 5-20% from an in the length direction seen end of the circuit board.

* * * * *